F. R. KLAUS AND H. W. KRANZ.
ELECTROPLATING APPARATUS.
APPLICATION FILED NOV. 6, 1919.

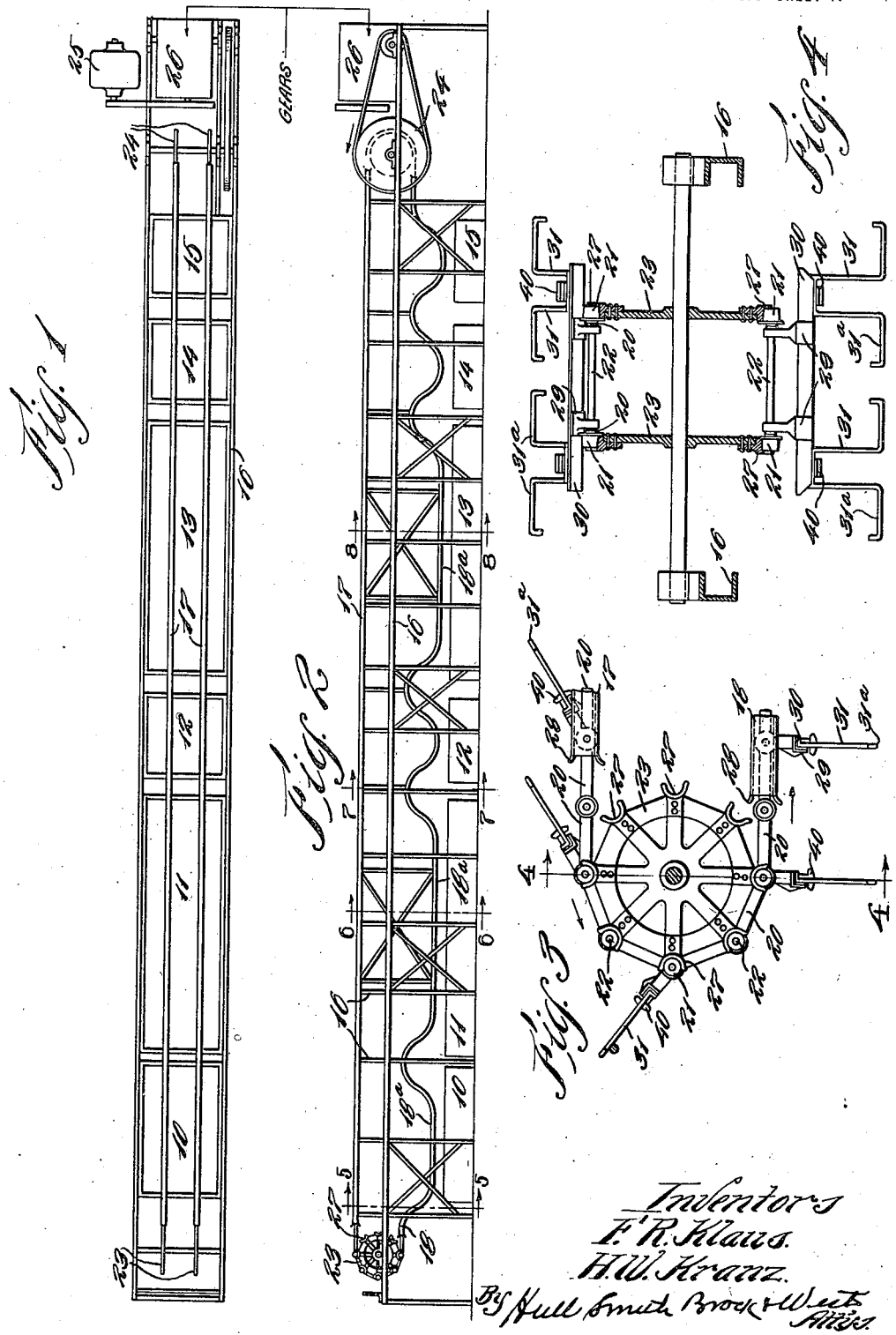

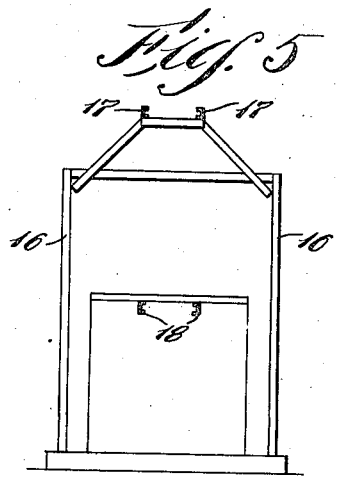
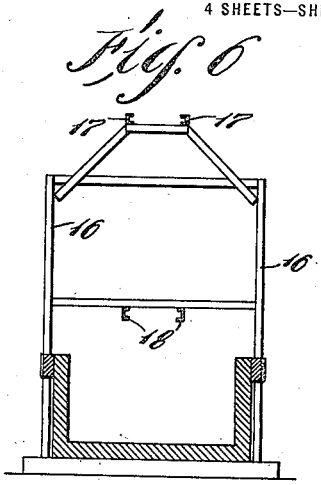
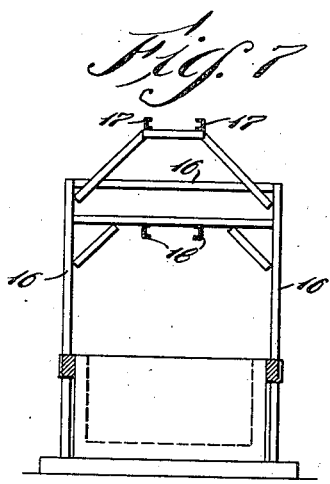
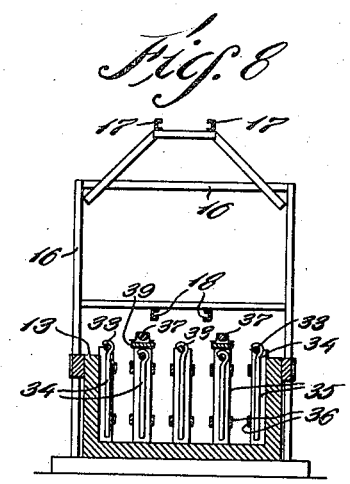
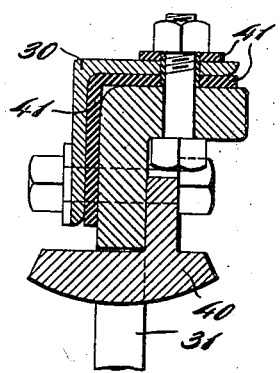
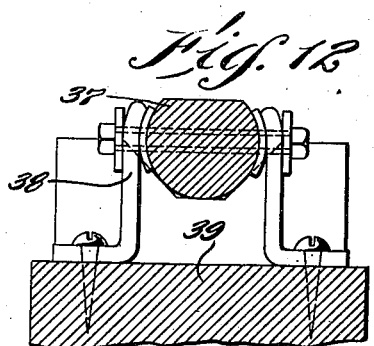

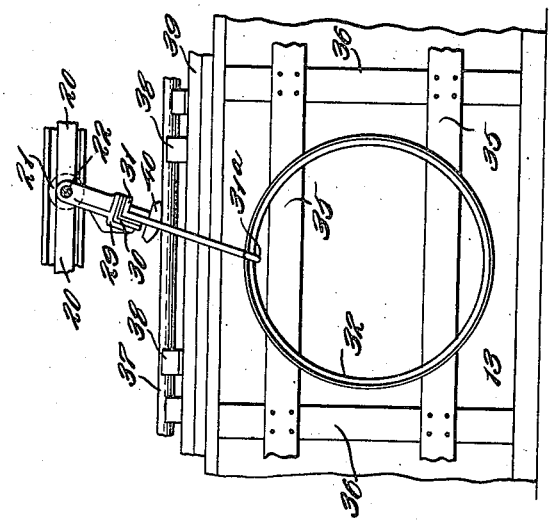
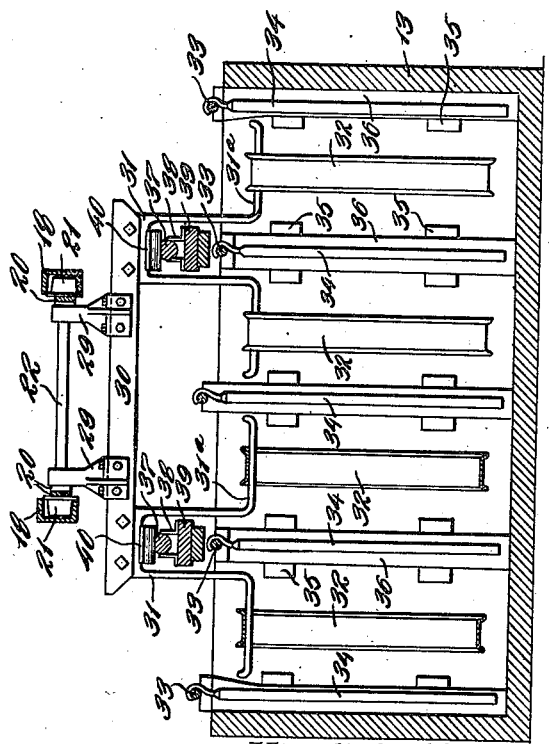

1,429,438.

Patented Sept. 19, 1922.
4 SHEETS—SHEET 4.

Inventors,
F. R. Klaus.
H. W. Kranz.
By Hull Smith Brock & West
Attys.

Patented Sept. 19, 1922.

1,429,438

UNITED STATES PATENT OFFICE.

FRED R. KLAUS AND HARRY WM. KRANZ, OF CLEVELAND, OHIO, ASSIGNORS TO THE HYDRAULIC PRESSED STEEL COMPANY, OF CLEVELAND, OHIO, A CORPORATION OF OHIO.

ELECTROPLATING APPARATUS.

Application filed November 6, 1919. Serial No. 336,075.

*To all whom it may concern:*

Be it known that we, FRED R. KLAUS and HARRY WM. KRANZ, citizens of the United States, residing at Cleveland, in the county of Cuyahoga and State of Ohio, have invented a certain new and useful Improvement in Electroplating Apparatus, of which the following is a full, clear, and exact description, reference being had to the accompanying drawings.

This invention relates to an electroplating apparatus and has for its object to provide in a single device, an efficient and easily operated apparatus for cleansing, pickling, plating, washing and drying sheet metal tire rims and similar articles.

Another object of the invention is to provide an apparatus of this nature which shall be continuous, so that the rims or other articles to be treated, can be placed in the apparatus at one end and delivered in their finished condition at the opposite end, thereby eliminating all labor for the intermediate handling of said rims or other articles; and also effecting a considerable saving in time and consequently materially reducing the cost of production.

With these objects in view, and certain others which will become apparent as the description proceeds, the invention consists in the novel details of construction and in the manner of combining and arranging the same, all of which will be more fully set forth hereinafter and pointed out in the appended claims.

Figure 13:
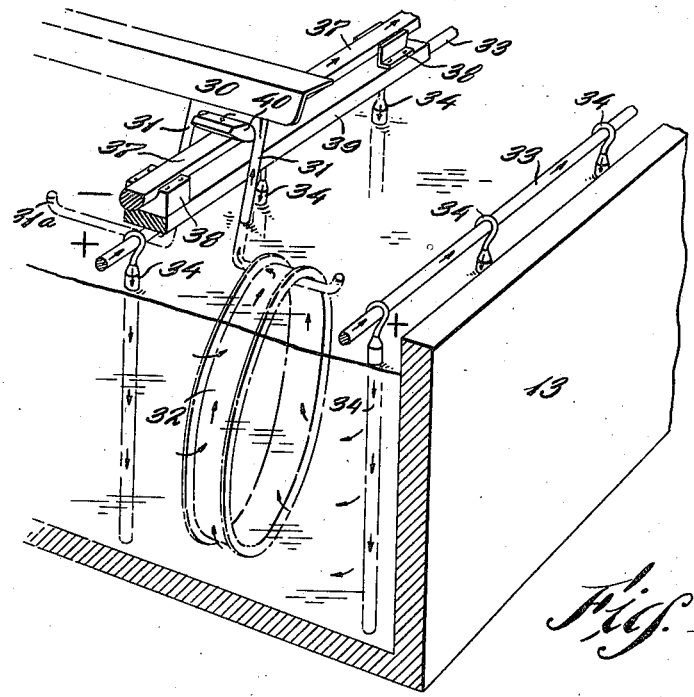
Figure 14:
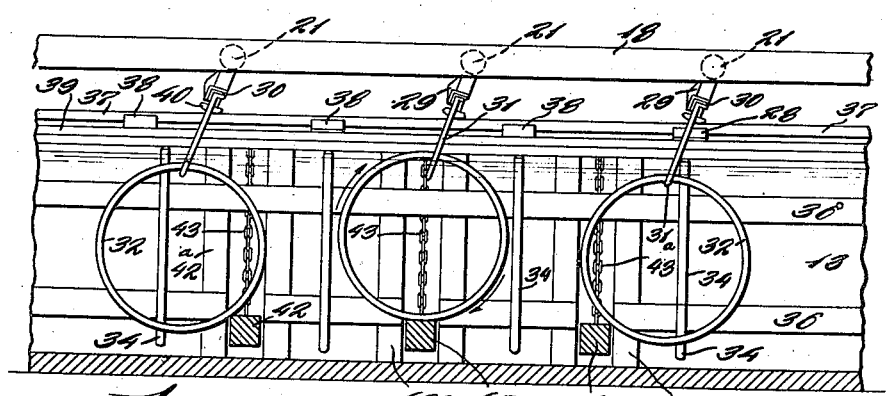

In the accompanying drawings forming a part of this specification, Fig. 1 is a diagrammatic plan of an electroplating apparatus embodying our invention; Fig. 2 is a side elevation of the same, the endless carrier being omitted in order to more clearly show the contour of the tracks upon which said endless carrier travels; Fig. 3 is a detail view showing one end of said endless carrier and the sprocket for actuating the same; Fig. 4 is a detail sectional elevation on the line 4—4 of Fig. 3; Fig. 5 is a transverse sectional view on the line 5—5 of Fig. 2; Fig. 6 is a transverse sectional view on the line 6—6 of Fig. 2; Fig. 7 is a similar view on the line 7—7 of Fig. 2; Fig. 8 is a transverse sectional view taken on the line 8—8 of Fig. 2 and showing the electrodes arranged in the plating tank; Fig. 9 is an enlarged sectional view taken through the plating tank and showing in elevation one of the carriers constituting a part of the endless conveyor and upon which the rims or other articles are hung or suspended; Fig. 10 is a side elevation of the same; Fig. 11 is a detail sectional view illustrating the connection between the hanger bracket and carrier bar; Fig. 12 is a sectional view of the track with which the carrier contacts and which serves as a support for said carrier and also as a conductor; Fig. 13 is a diagrammatic view illustrating the circuit; Fig. 14 is a detail view illustrating the means for causing the rims or other circular articles to roll upon the bracket hanger during transit through the plating tank.

Tire carrying rims for use in connection with automobile tires are usually made of sheet metal in the course of fabrication become covered with oil and dirt, and as a first step toward finishing these rims it is necessary to remove this oil and dirt and this is usually accomplished by first heating or otherwise treating the said rims. After this cleaning operation has been accomplished the rim is placed in a pickling bath preparatory to being introduced into the electroplating bath or tank where a protective coating is applied thereto by the well known electroplating process, and then after this electroplating operation has been completed, it is necessary to thoroughly wash or cleanse the rims, and they are then finally dried. Heretofore, so far as we are aware these various operations have been performed in separate tanks or receptacles and it was necessary to employ a considerable number of workmen and various apparatus to place the rims into the various tanks or receptacles, remove the same and shift them from one receptacle to another in order to complete the various operations which were required to completely finish the said rims.

These various operations as heretofore performed not only require a considerable number of workmen but also a considerable amount of time for the proper handling of a quantity of rims, and it is with the object of effecting a material saving in time and labor that we have devised the present form of apparatus so that by means of a single device, all of the hereinbefore recited operations can be had upon a quantity of rims, with only one operator being necessary to place the rims upon the hangers at one end of the device and another operator to remove them at the other end of the device, the rims being automatically carried through the furnace or cleanser, the pickler, the plating tank and the washing and drying tanks, and in practice we make the apparatus of such dimensions that a considerable number of rims can be passed therethrough at one time at the proper speed to thoroughly and properly electroplate all of the rims passing through the device. In other words, the apparatus as a unit is a continuous automatic operating device requiring the attention of two operators only, namely, one to place the rims thereon and the other to remove them therefrom.

In the practical embodiment of our invention, we employ any suitable type of furnace or heater or other cleanser 10 and at the end thereof and in line therewith we arrange a pickling vat 11, and in line with this vat we place a rinsing vat 12 and this is followed by a plating vat or receptacle 13, which in turn is followed by a cold water vat 14, and a hot water vat 15 completes the series of vats or receptacles. It will be noted that all of these vats or receptacles are of substantially the same width and the lengths thereof will be determined by the period of time which the rims or other articles should remain therein during their passage therethrough. About and over this train of vats we provide a skeleton frame 16 for supporting the upper guide rails 17, and the lower guide rails 18, these upper and lower guide rails constituting the tracks upon which travels the endless conveyor for the purpose of conveying a plurality of rims or other articles successively to the various tanks or vats so that the various operations can be performed upon said rims or other articles.

The upper rails 17 and the lower rails 18 are preferably constructed of channel iron with their channeled faces opposed, and it will be noted that the upper track 17 is horizontal and level from end to end, whereas the lower track is serpentine in form, the level portions 18ª being directly over the major portion of the various tanks or receptacles, while the curved portions thereof are arranged directly over the ends or meeting points of the several vats or receptacles, the purpose of this contour being to cause the rims to travel through the receptacle from one end to the other and be elevated out of one receptacle and lowered into the next adjacent one.

The endless conveyor which travels upon the tracks 17 and 18 consists of two endless chains composed of a series of links 20, pivotally connected together, and at each alternate connection there are arranged guide rollers 21 which travel in the grooved or channeled guide rails 17 and 18 before described, and these rollers 21 are carried at the opposite ends of the rods 22 which serve the double purpose of connecting the links and carrying the guide rollers. The endless conveyor consisting of the endless chains, cross rods and guide rollers, travels around sprockets 23 and 24 arranged at the opposite ends of the frame, the sprocket 24 being a power sprocket receiving its power from any suitable source, such as an electric motor 25, and any suitable train of gears and clutch mechanism 26 may be interposed between the motor and the power sprocket in order to feed the endless conveyor at the proper rate of speed.

The sprocket arms are provided with suitable sockets 27 at their outer ends for receiving or engaging the guide rollers and causing the endless conveyor to travel properly around the said sprockets and the ends of the guide rails are preferably flared as shown at 28 in order to permit the easy movement of the guide rollers into and out of the same. Each cross rod 22 has brackets 29 connected thereto which support an angle-iron cross bar 30, and at the opposite end of each cross bar 30 there is suspended a hanger 31 comprising a central yoke which is attached to the end of the cross bar, and the oppositely extending arms 31ª upon which the rims 32 are hung.

Along each edge of the plating tank and also along the central and intermediate portions of said tank there are arranged conductor rails 33 from which are suspended the positive electrodes or anodes 34, these electrodes being held in place by suitable horizontal strips of wood or similar material 35 connected to vertical strips of wood or similar material 36 attached to the inner sides of the vat and also at the center and intermediate portions of said vat. Extending above the plating vat from end to end thereof, are the conductor rails 37 supported by suitable insulating shoes 38 upon stringers 39 arranged longitudinally with the tank above the intermediate conductor rails 33 and supporting said conductor rails and traveling upon and contacting with these conductor rails 37 are shoes 40, which are connected to the yokes of the hangers 31. The hangers 31 are thoroughly insulated from the angle cross bar 30 by means of suitable insulation 41.

As previously stated the positive electrode 34 is connected to the conductor rail 33 and will consist of a bar of zinc when the rims are zinc plated, the usual solution of zinc sulphate being the electrolyte, and the rims will constitute the negative element and the current passing through the conductor rail 33 will pass to the positive electrode and from it through the electrolyte to the rim or negative electrode, and up the hanger to the shoe, and along the conductor rail 37 to any suitable terminal connection, and it is obvious that so long as the rim resting upon the arm is within the electrolytic solution the plating operation will be carried on.

We have shown the electroplating tank divided longitudinally into four compartments, but it is obvious it can be divided into any desired number of compartments. When the tank is divided into four compartments one cross bar 30 will be sufficient to carry two hangers and each hanger is capable of receiving one or more rims upon each arm thereof and as each cross bar 30 is hung from each connecting rod 22, it will be clearly understood that as the power sprocket is driven, the endless conveyor will travel in the direction indicated in Figs. 2 and 3, and as the endless conveyor travels around the hangers are caused to travel the same path, and pass around the sprockets 23 at the opposite end of the apparatus.

When the hangers 31 have moved around the sprocket 23 at the forward end of the machine, the rims 32 are hung upon the arms 31$^a$ and are first lowered into the furnace or other cleaner 10 by the guide rollers 21 traveling down the incline 18$^b$ of the track 18. The rims travel through the furnace or other cleaner where they are heated or otherwise treated in order to melt, loosen or remove the oil or grease which may be thereon and when the conveyor has advanced sufficiently the rims will be elevated out on the furnace or cleaner and caused to descend into the pickling vat and here they travel along from the forward end of said pickling vat to the rear end thereof where they are once more elevated out of the pickling vat and lowered into the rinsing vat, due to the contour of the guide rails 18$^a$, and from the rinsing vat the rims are introduced into the plating vat and each set of rims will travel in its respective longitudinal compartment, and inasmuch as there are a series of positive electrodes extended along the entire length of the plating vat it is obvious that continuous electrolytic action will take place during the passage of the rim through the plating vat.

In order to cause the rims to turn or roll around on the supporting arms 31$^a$, we interpose an obstruction 42 in the bottom of the vat, said obstruction being placed between two upright strips 42$^a$ connected to the side of the vat and serving as vertical guides for the obstruction; and connected to each obstruction is a chain or wire 43, by means of which it can be raised or lowered as desired to accommodate rims of different sizes. By means of this obstruction the rims, in passing through the tank, will contact with the obstructions and be elevated slightly and then drop back upon the arms as they clear the obstruction and in so doing they will roll or turn around on the arms so that by employing a series of these obstructions the rims will be rolled or turned several times during their passage through the plating tank, and in this manner a uniform or even distribution of plating is sure to be obtained.

When the rims reach the end of the plating tank or vat they are elevated out of said tank or vat and lowered into the cold water rinsing vat and then elevated from that and deposited into the hot water rinsing vat from which they emerge hot and consequently will dry in a very short space of time, so that by the time they reach the delivery end of the machine after having been lifted from the last vat they will be dry when lifted off the hanger arms by the operator.

It will thus be seen that we provide an exceedingly simple and highly efficient apparatus which as a unit will continuously and automatically move a plurality of rims or other articles from one end of the machine to the other, and during such movements, subject them to all of the various operations necessary to successfully electroplate such rim or articles thereby effecting a material saving in both time and labor over the methods now commonly practiced upon such articles.

Having thus described our invention, what we claim is:—

1. In an electroplating apparatus, a cleaner, pickling, washing and electroplating tanks and a continuous conveyor for carrying articles through the cleaner and into and out of the said tanks.

2. In an electroplating apparatus, a cleaning furnace, pickling, washing and electro-plating tanks and a continuous conveyor for carrying articles through the furnace and into and out of the said tanks.

3. In an electroplating apparatus, an electro-plating tank, a row of anodes therein, an endless carrier having holders for suspending a row of rims adjacent the row of anodes and guard rails between the row of anodes and the row of rims.

4. In a device of the kind described, the combination with a plurality of receptacles adapted for successive treatment of articles thereon, of a track extending above said receptacles, said track being elevated at points above the adjacent ends of said receptacles, a return track, an endless conveyor movable upon said track, said conveyor including a carrier adapted to receive the articles to be successively moved into, through and out of said receptacle.

5. In an electroplating apparatus the combination of an electroplating tank, an endless carrier, work holders pivotally supported by the endless carrier, contact shoes carried by said pivoted work holders and contact rails engaging said shoes and supporting said work holders.

6. In a device of the kind described, the combination with a plurality of receptacles, one of which is an electroplating receptacle, of a track extending over said receptacle, a return track, an endless conveyor including a carrier adapted to hold the article to be plated, and means carried by said carrier and cooperating with means connected with the electroplating receptacle for maintaining the article in electrical contact during the passage through said receptacle.

7. In a device of the kind described, the combination with a plurality of receptacles arranged end to end, of a track above said receptacles, said track being arched upwardly over the adjacent ends of said receptacles, a return track, and an endless conveyor including a carrier adapted to travel upon said tracks as set forth.

8. In a device of the kind described, the combination with a plurality of receptacles arranged end to end, of a track above said receptacles, said track being arched upwardly at different points, a return track, an endless conveyor upon said tracks, a carrier connected to said conveyor, and insulated therefrom, said carrier being adapted to receive articles to be plated, a conductor rail and a shoe connected to said carrier and adapted to contact with said rail an anode and a conductor member to which said anode is connected.

9. In a device of the kind described, the combination with a receptacle adapted to receive an electroplating solution, a track above said receptacle, a conveyor movable upon said track, a carrier connected to said conveyor, a conductor member, positive electrodes connected thereto, a second conductor member and a shoe attached to the carrier and adapted to contact with said second conductor member.

10. In a device of the kind described, the combination with the upper and lower tracks and sprockets, of the endless chains, cross rods and rollers traveling upon said tracks, brackets connected to the cross bars connected to said brackets, carriers connected to said cross bars and having arms to receive articles to be treated, and a plurality of receptacles arranged beneath the lower track, said lower track being arched over the adjacent ends of said receptacles.

11. In a device of the kind described, the combination with a receptacle, of anodes arranged therein, a conductor member to which said anodes are attached, a carrier adapted to receive an article to be plated, a shoe attached to said carrier, a second conductor member with which said shoe contacts, an endless conveyor, to which the carrier is connected and tracks and sprockets over which said conveyor moves.

12. In a device of the kind described, the combination with a receptacle, of electroplating means arranged in connection with said receptacle, a carrier movable with reference to said receptacle, and adapted to carry an article through said receptacle, an obstruction arranged in the receptacle and in the path of said article and adapted to contact with said article to elevate and roll the same upon the carrier as set forth.

13. In a device of the kind described, the combination with a receptacle, of electroplating means arranged in connection with said receptacle, a carrier movable with reference to said receptacle, and adapted to carry an article through said receptacle, an adjustable obstruction arranged in the receptacle and in the path of said article and adapted to contact with said article to elevate and roll the same upon the carrier as set forth.

14. In an electroplating apparatus, an endless carrier, an electroplating tank, work holders attached to said endless carrier, and means above the tank for making an electrical contact with the holders and for supporting the weight of the holders.

15. In an electroplating apparatus, the combination with a plurality of tanks of a track arranged above said tanks, a conductor element, an endless carrier associated with said track, work holders connected to said conveyor and contacting with said conductor, said work holders being adapted to be moved into intimate electrical contact with said conductor by the weight of the articles to be electroplated which are carried thereby.

16. In an electroplating apparatus, an electroplating tank, a non-conducting beam extending longitudinally over the tank, a conductor rail carried on the under side of the beam, anodes suspended from said conductor rail, a conductor rail supported on the top of the beam and work holders contacting with said upper conductor rail.

17. In an electroplating apparatus, a plurality of tanks, a track arranged above said tanks, a conductor rail, an endless carrier adapted to travel upon said track, a plurality of work holders pivotally connected to said carrier and adapted to contact intermediate the ends thereof with said rail, said holders being obliquely disposed with respect to said rail when in engagement therewith whereby the work which is carried thereby causes an intimate engagement of the work holder with said rail.

In testimony whereof, we hereunto affix our signatures.

FRED R. KLAUS.
HARRY WM. KRANZ.